Figure 1:
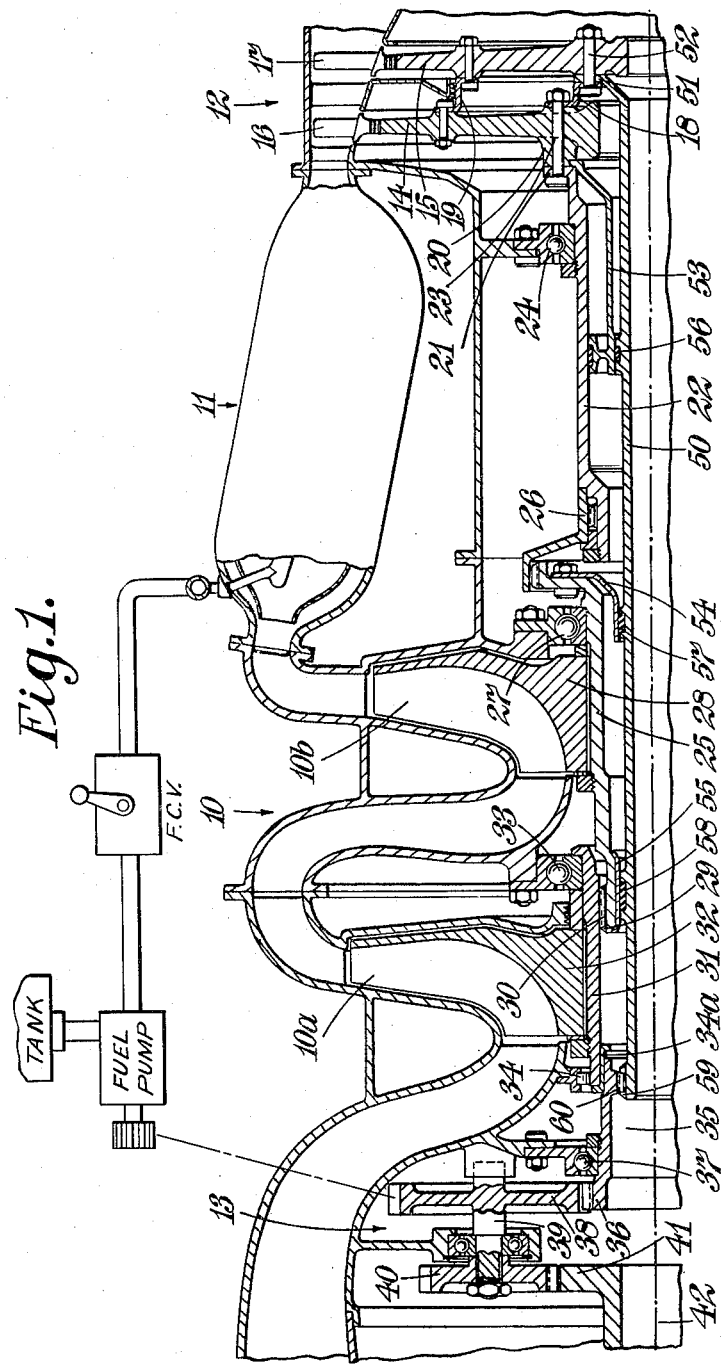

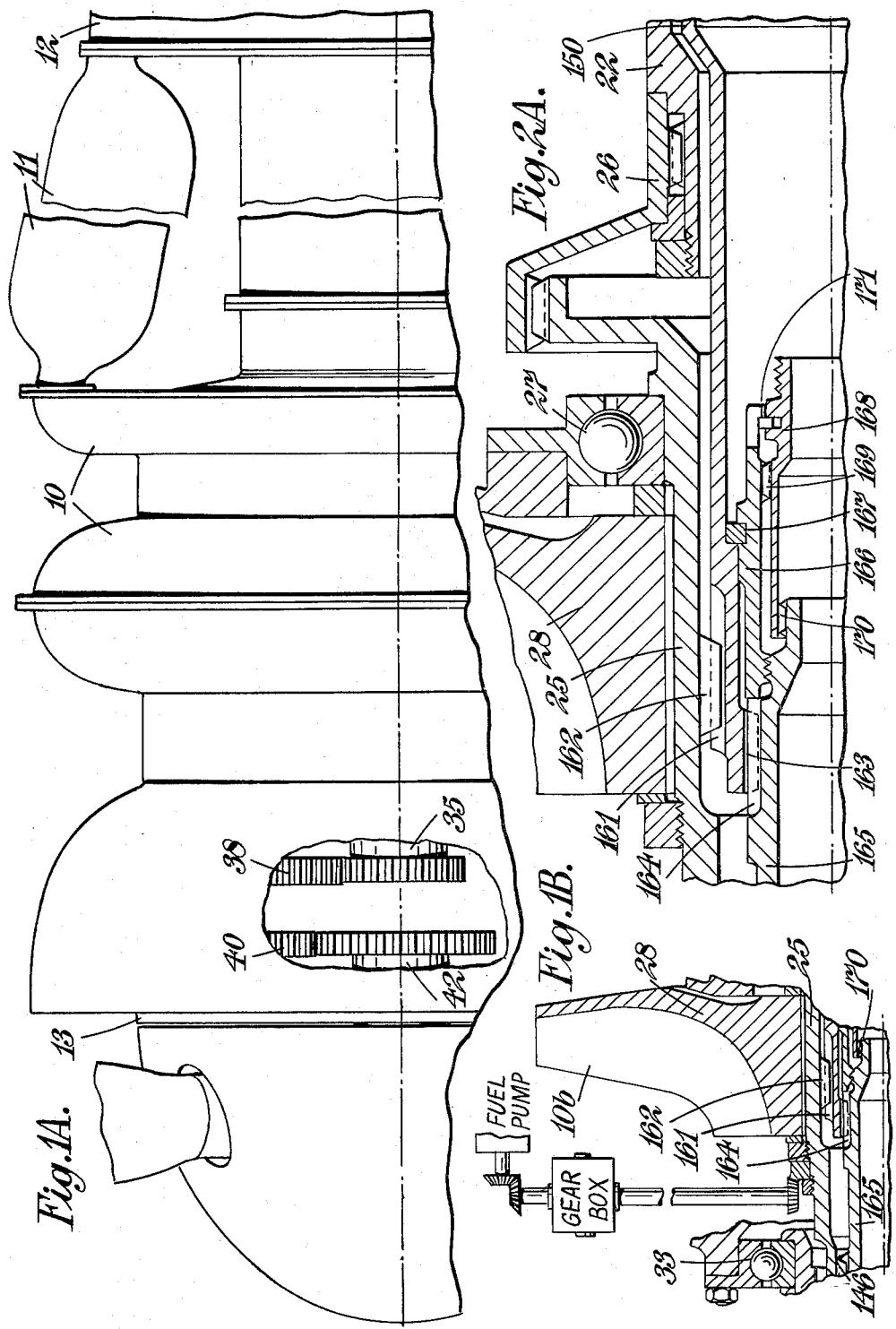

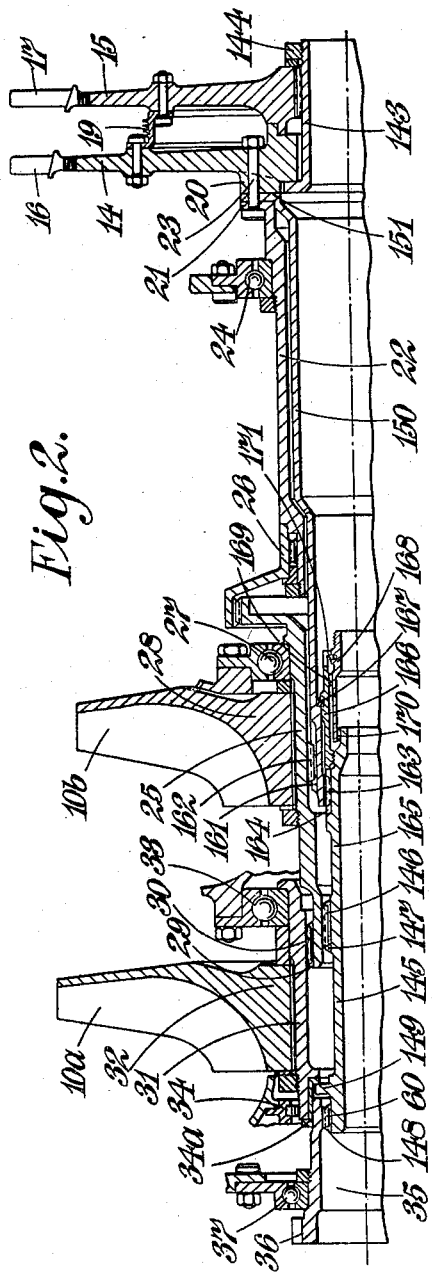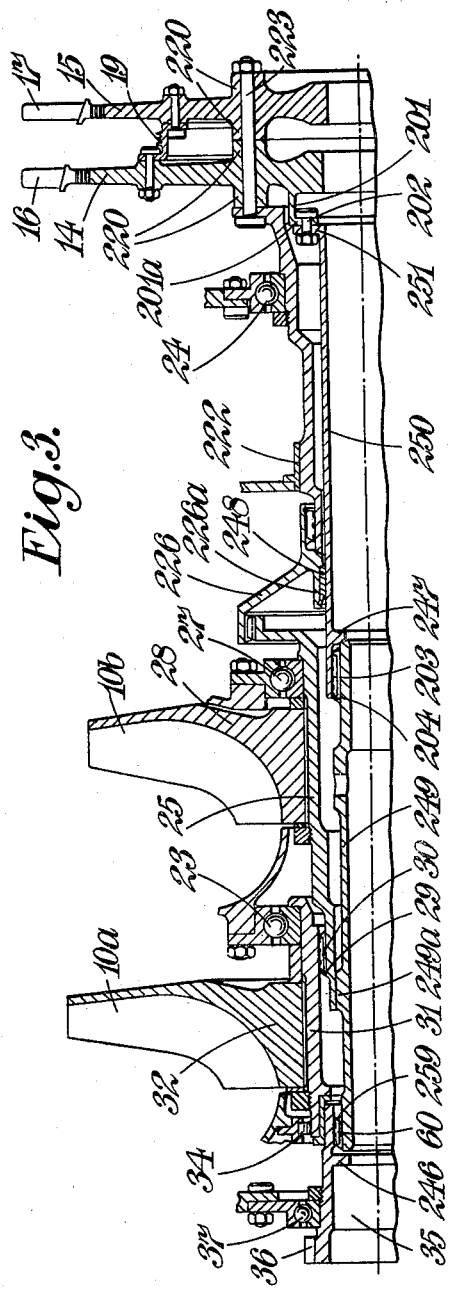

United States Patent Office 2,977,758
Patented Apr. 4, 1961

2,977,758

PROPELLER DRIVING GAS-TURBINE ENGINES

Lionel Haworth, Littleover, Ralph John Shire, Normanton, Derby, and Donald McLean, Allestree, Derby, England, assignors to Rolls-Royce Limited, Derby, England, a British company Filed Feb. 9, 1956, Ser. No. 564,566

Claims priority, application Great Britain Feb. 18, 1955

11 Claims. (Cl. 60—39.31)

This invention relates to gas-turbine engines and is particularly concerned wtih propeller-driving gas-turbine engines.

Such engines normally comprise a compressor system delivering air to combustion equipment wherein fuel is burnt, the products of combustion passing to a turbine system whereof a turbine rotor is connected to a compressor rotor system to drive it by shaft means, the shaft means extending beyond the compressor to drive the propeller, usually through reduction gearing.

It is an object of the present invention to minimise the consequences of the failure of such shaft means.

According to one aspect of this invention, in a propeller-driving gas-turbine engine, a turbine rotor is connected to drive both a compressor rotor and the propeller through shaft means including first and second coaxial shafting drivingly inter-connecting the turbine rotor, the compressor rotor and the propeller in such manner that in the event of a failure in the first or second shafting, the turbine rotor remains drivingly connected to the compressor rotor or the propeller or both.

According to another aspect of the present invention a propeller-driving gas-turbine engine comprises a compressor having a rotor and taking in air from atmosphere, combustion equipment connected to receive air from the compressor to have fuel burnt therein, a turbine having a rotor and connected to receive the products of combustion from the turbine, first shaft means drivingly interconnecting the turbine rotor and the compressor rotor, and second shaft means co-axially within said first shaft means, said second shaft means being arranged to transmit torque between said turbine rotor and said propeller at least in the event of failure occurring in part of the length of said first shaft means.

According to a preferred feature of the present invention, the second shaft means is torsionally engaged with the turbine rotor, extends through the entire length of the first shaft means, and has a part remote from the turbine rotor drivingly connected to the propeller, the second shaft means being torsionally free from the first shaft means. With this arrangement, if the first shaft means should fail between the compressor rotor and the turbine rotor, the compressor rotor of the engine will cease to be driven, and if the first shaft means should fail elsewhere in its length, say between low-pressure and high-pressure sections of the compressor rotor, the part of the compressor rotor on the side of the failure remote from the turbine rotor will cease to be driven. The second shaft means may either be a single continuous shaft or may comprise a plurality of shaft sections arranged end to end and drivingly inter-connected, one shaft section being torsionally engaged with the turbine rotor, and another shaft section being torsionally engaged with the quill shaft.

In one arrangement according to this feature of the invention, the turbine is a multi-stage turbine having a plurality of torsionally-interconnected turbine discs, whereof one end disc is connected to the first shaft means, and whereof the other end disc is in torque-transmitting engagement with the second shaft means, and the latter has a part remote from the turbine rotor in torque-transmitting engagement with a quill shaft carrying the input gear of reduction gearing, whereof the output gear is connected to the propeller to drive it. In another arrangement, both the first and second shaft means are torsionally engaged with the same one of the discs.

In each of these arrangements, the multi-stage turbine may be a two-stage turbine having a high-pressure turbine disc and a low-pressure turbine disc torsionally connected to said high-pressure disc, and the first shaft means may comprise a turbine shaft connected to the high-pressure turbine disc, a first compressor shaft carrying a high-pressure compressor rotor and drivingly interconnected at its rear end with the turbine shaft, and a second compressor shaft carrying a low-pressure compressor rotor and drivingly interconnected at its rear end with the first compressor shaft.

There may also be provided means to support the second shaft means concentrically within the first shaft means, said support means permitting the second shaft means to be torsionally free of the first shaft means.

According to another feature of the invention, the second shaft means is in torque-transmitting engagement with the turbine rotor and extends to the region of the compressor rotor where it is, at least in the event of failure occurring in part of the length of said first shaft means, in torque-transmitting engagement with the first shaft means, which is also drivingly connected with the propeller at its end remote from the turbine. In this way on failure of the first shaft means between the compressor rotor and the turbine rotor, torque will continue to be transmitted, at least temporarily, from the turbine rotor to the compressor rotor by the second shaft means.

In one arrangement according to this feature of the invention, the compressor is a two-stage compressor having a low-pressure rotor and a high-pressure rotor in flow series, and the first shaft means comprises a low-pressure compressor shaft having the low-pressure compressor rotor mounted thereon, a high-pressure compressor shaft having the high-pressure compressor rotor mounted thereon, a turbine shaft, said high-pressure compressor shaft being at one end in torque-transmitting engagement with the low-pressure compressor shaft and at its other end in torque-transmitting engagement with the turbine shaft, a drive shaft in torque-transmititng engagement with the high-pressure compressor shaft, the drive shaft having one end in torque-transmitting engagement with a quill shaft carrying the input gear of a propeller-driving reduction gear, and the second shaft means is coaxially within the turbine shaft and part of the high-pressure compressor shaft and is, in the event of failure occurring in that part of said first shaft means between the high-pressure compressor rotor and the turbine, in torque-transmitting engagement with said high-pressure compressor shaft. The second shaft means may also be in torque-transmitting engagement with an extension of said drive shaft, in the event of failure occurring in that part of said first shaft means forward of the high-pressure compressor rotor.

Three embodiments of the invention will now be described by way of example with reference to the accompanying drawings, in which:

Figure 1 shows a propeller-driving gas turbine engine in longitudinal section,

Figure 1A is a fragmentary side elevational view of a gas-turbine propeller-driving engine with parts broken away to show the driving connection between the engine and the propeller, Figure 1B is a fragmentary longitudinal sectional view showing the drive connection between the engine fuel pump and a compressor shaft of the engine, Figure 2 is a similar view of another arrangement, with parts cut away, Figure 2A is an enlarged view of the center portion of Figure 2, and Figure 3 is a similar view of yet another arrangement.

The gas turbine engine of the first embodiment comprises a two-stage centrifugal compressor 10 of which the low-pressure stage 10a draws in air from atmosphere and delivers it to the high-pressure stage 10b, combustion equipment 11 to which the air is delivered by the high-pressure stage for combustion with fuel therein, and a two-stage turbine 12 to which the products of combustion are delivered from the combustion chamber, and from which the exhaust passes to atmosphere. The engine also comprises a reduction gear 13 through which a propeller (not shown) is driven by the engine.

The two-stage turbine comprises a pair of rotor discs 14, 15, one for each row of turbine rotor blades 16, 17, and the rotor discs are torsionally interconnected near their centers by being bolted to oppositely-directed flanges of a Z-section ring 18 between them and are torsionally interconnected at a greater radius by being bolted to a second Z-section ring 19. The high-pressure turbine rotor disc 14 is formed with a series of bosses 20 on its upstream side near its center, and is secured to a flange 21 on the downstream end of the turbine shaft 22 by throughbolts 23 which pass through the bosses 20 and also through one of the flanges of ring 18. The turbine shaft 22 is supported and located in stationary structure of the engine by a ball thrust bearing 24 near the bolting flange 21.

At its upstream end the turbine shaft 22 is drivingly interconnected to a high-pressure compressor shaft 25 through a coupling 26 permitting slight angular malalignment and relative axial movement, and the high-pressure compressor shaft is supported and located by a ball thrust bearing 27 near the coupling. The impeller 28 of the high-pressure stage 10b of the compressor is in splined engagement with the shaft 25, and the shaft is formed with external splines 29 at its upstream end to engage with corresponding internal splines 30 on a low-pressure compressor shaft 31 which has the impeller 32 of the low-pressure stage 10a of the compressor splined to it. The low-pressure compressor shaft 31 is supported and located at its downstream end by a ball thrust bearing 33, and is supported at its upstream end in a roller bearing 34. There is also provided a bush 34a which extends within the bore of shaft 31 and which is mounted on the rear end of a quill shaft 35. The latter is formed at its forward end with a high-speed pinion 36 forming part of the reduction gear 13 and is supported and located by a ball thrust bearing 37 near the pinion.

The high-speed pinion 36 meshes with a gear 38 carried on a layshaft 39 mounted in stationary structure, and a pinion 40 connected to rotate with the layshaft gear 38 drives another gear 41 connected to the propeller shaft 42, so that the propeller rotates at a lower speed than the quill-shaft 35. It should also be mentioned that the engine fuel pump is normally driven from the reduction gear, e.g. from the layshaft 39, or from an auxiliary gear box which is itself driven from a compressor shaft of the engine.

The quill shaft 35 is driven by the turbine by means of an additional shaft 50 which extends concentrically through the turbine shaft 22 and the compressor shafts 25, 31, just described, the additional shaft 50 being formed with a flange 51 at its rear end which is secured between the low-pressure turbine disc 15 and the cooperating flange of the Z-section ring 18, by means of throughbolts 52 passing through the ring 18, flange 51 and disc 15. Along its length the additional shaft 50 may be supported concentrically within the first shaft means 22, 25, 31, for example by providing sleeves 53, 54, 55 mounted within the first shaft means and engaging bushes 56, 57, 58 mounted on the additional shaft 50. There may be three such sleeves near the respective thrust bearings 24, 27, 33 of the turbine shaft 22 and the compressor shafts 25, 31, and the bushes 56, 57, 58 on the additional shaft 50 may be of rubber or similar material. It will be arranged that the additional shaft 50 is substantially unrestrained torsionally with respect to the first shaft means 22, 25, 31.

The additional shaft 50 is formed with external splines 59 at its forward end and these splines 59 engage with internal splines 60 within the rear end of the quill shaft 35.

In this way the quill shaft 35 and thus the propeller shaft 42 and the propeller carried thereby are driven by the turbine through a second shafting means which is independent of the first shafting means between the turbine and the two-stage compressor.

If the additional shaft 50 should fail the turbine will be relieved of the load of the propeller and will drive the compressor at a higher speed, acting as a simple jet propulsion gas-turbine engine. It may be arranged that this higher speed is not greatly in excess of the normal maximum speed of rotation, and the strength of the rotating parts may therefore be such that temporary rotation of the turbine and compressor at this speed is not disastrous. The propeller will windmill if the failure occurs in flight and, when a constant speed unit is fitted as is usual, the propeller will either be controlled by the unit to remain at a constant speed, or if the power available to cause the propeller to windmill is not enough the speed of the propeller will fall.

If the first shaft means 22, 25, 31 should fail in operation the turbine will continue to be connected to the propeller through shaft 50. If the failure is on the compressor side of the high-pressure turbine disc the rate of air supply to the combustion chamber 11 will be diminished, and thus the power developed by the turbine will decrease and under certain circumstances during flight the propeller will windmill and will drive the turbine. It should be noted that in this case the propeller does not also drive the section of the compressor on the side of the shaft failure remote from the turbine. Thus if the failure is between the impeller 28 of the high-pressure compressor 10b and the turbine of the impellers of both compressor stages will cease to be driven and come to a standstill, and if the failure is between the impeller 32 of the low-pressure stage 10a and the impeller 28 of the high-pressure stage 10b then the impeller 32 of the low-pressure stage 10a will come to a standstill. In either case the situation in which the compressor is driven by the windmilling propeller and consequently air is continuously delivered to the combustion chambers is avoided. If the fuel pump is driven from the reduction gear 13 or say from the high-pressure compressor shaft 25, when the failure is between the impellers of the low-pressure and high-pressure stages of the compressor, fuel will continue to be delivered to the combustion chamber, and overheating of the turbine may occur. If on the other hand the fuel pump is driven, say, through an auxiliary gear box from one of the compressor shafts 25, 31 on the side of the failure of the first shaft means remote from the turbine, clearly the fuel pump will cease to rotate. In any case the turbine is connected through the shaft 50 and the reduction gear to the propeller and is therefore prevented from overspeeding.

If the failure is on the downstream side of the high-pressure turbine disc, e.g., a failure of the Z-section ring 18 which may be considered in effect as part of the first shaft means, the low-pressure turbine disc will remain connected through shaft 50 to the propeller, and will thus be prevented from overspeeding, and the high-pressure turbine disc will continue to drive both compressor rotors and act as a simple jet-propulsion gas-turbine engine, but at a lower speed than previously because the compressor rotors absorb more than half the power output of the whole turbine.

In the arrangement shown in Figure 2 the gas-turbine engine is similar to that described in relation to Figure 1 and the corresponding parts are given the same reference numerals.

Instead of the additional shaft 50 however there is provided a drive shaft 145 which interconnects the first compressor shaft 25 and the quill shaft 35, and also a stand-by shaft 150 which will be described below.

The first compressor shaft 25 is formed internally with splines 146 at its forward end which engage with external splines 147 on the drive shaft 145. The drive shaft is also formed externally at its forward end with splines 148 which engage the internal splines 60 on the quill shaft 35. The shaft 145 is also provided with a flange 149 which abuts an inwardly-turned flange on the bush 34 to locate the shaft 145 axially. The quill shaft 35 and thus the propeller shaft 42 of the engine are normally driven by the turbine through turbine shaft 22, the high-pressure compressor shaft 25, splines 146, 147, drive shaft 145 and splines 148 and 60. The low-pressure compressor shaft 31 is driven as in the previous arrangement from the shaft 25 through splines 29, 30.

The stand-by shaft 150 is preferably secured to the low-pressure turbine disc as described for the shaft 50 in connection with Figure 1, but in the alternative arrangement shown in Figure 2 is formed at its rear end with a flange 151 which is secured between the flange 21 on the turbine shaft and the bosses 20 on the high-pressure turbine disc 14 by means of the throughbolts 23 which pass through the flanges 21, 151, and through the disc 14. In this arrangement the turbine discs 14, 15 are shown as being torsionally interconnected at inner radius by means of a large-diameter throughbolt 143 the head of which abuts the upstream face of the high-pressure disc 14 and which engages with a nut 144 which abuts the downstream face of the low-pressure disc 15. The throughbolt 143 may also, as shown, be splined to the low-pressure disc, and the discs 14, 15 may be in spigot engagement with one another.

At its forward end the stand-by shaft 150 is formed with external splines 161 which co-operate with internal splines 162 formed within the high-pressure compressor shaft 25, and the stand-by shaft 150 is also formed with internal splines 163 which co-operate with external splines 164 formed on a rearward extension 165 of the drive shaft 145. The two sets of splines 161, 162 and 163, 164 are arranged to have a circumferential clearance in normal operation so that normally no drive is transmitted through these sets of splines.

The extension 165 of the drive shaft 145 is also engaged with the stand-by shaft 150 by means of a nut member 166 which is in threaded engagement with the extension 165 and abuts an axial face within the stand-by shaft 150 through a ring 167. The nut member 166 may be located against rotation with respect to the extension 165 (as described in our U.S. patent application Serial No. 546,695, now Patent No. 2,836,041), by means of a locking sleeve 168 which is externally serrated at 169 to engage the nut member 166 and is internally serrated at 170 to engage the extension 165. The locking sleeve 168 is prevented from axial disengagement by means of a spring ring 171 which protrudes from a groove in the sleeve to engage with an inwardly-turned flange on the nut member 166.

If the first shaft means should fail between the impeller 28 of the high-pressure compressor and the turbine, that is, should there be a failure of the turbine shaft 22 or the coupling 26, the clearance between the splines 161, 162 will be taken up and a drive transmitted from the turbine to the high-pressure compressor shaft 25 through the stand-by shaft 150.

If the high-pressure compressor shaft 25 should fail forward of the high-pressure compressor impeller 28, the clearance in the splines 163, 164 will be taken up and the impeller 32 of the low-pressure compressor will be driven through the stand-by shaft 150, the splines 163, 164, the extension 165, splines 146, 147 and splines 29, 30, and the quill shaft 35, which drives the propeller shaft 42, will also be driven through the extension 165, drive shaft 145 and splines 148, 60. In this case the impeller 28 of the high-pressure compressor will continue to be driven through the turbine shaft 22.

Referring now to Figure 3, there is illustrated a further construction in which parts which are similar to those of the construction of Figure 1, are indicated by the same reference numerals.

In this construction, the turbine discs 14, 15 are provided adjacent their centers with a series of circumferentially-spaced bosses 220 through which extend a ring of bolts 223 by which the discs are attached to a flange 21 on the end of a short turbine shaft 222. The disc 14 is provided on its upstream face, radially within the bosses 220, with an axial flange 201 with an inturned peripheral portion 201a.

An additional shaft 250 is secured over a flange 251 to the flange portion 201a by bolts 202, and extends coaxially within the turbine shaft 222 and coupling sleeve 226, by which the turbine shaft is drivingly connected to the first compressor shaft 25, to terminate in the plane of the bearing 27 supporting the shaft 25. At this end the additional shaft 250 is provided with internal splines 203 which engage with external splines 204 on a second additional shaft 249 which extends from the plane of the bearing 27 coaxially within the compressor shafts 25, 31 to within the quill shaft 35. The second additional shaft 249 is provided at this end with external splines 259 to engage with the internal splines 60 on the quill shaft 35.

The additional shaft 250 is supported, adjacent its splined connection with the second additional shaft 249, by a bush 248 fitted inside an axial extension 226a of the coupling 226, and the second additional shaft 249 is supported between its ends by being provided with an annular land 249a fitting within the upstream end of the first compressor shaft 25. The second additional shaft 249 is prevented from axial movement sufficient to disengage its splined connections with the additional shaft 250 and the quill shaft 35 by internal shoulders 247, 246 on the additional shaft and the quill shaft respectively.

It will be seen that in this construction, as in the construction of Figure 1, the quill shaft 35 (and thus the propeller) is driven by the turbine through a drive which is independent of the drive between the turbine and the two-stage compressor. The operation of the arrangement is the same as in Figure 1, and thus if failure should occur in either of the additional shafts 250, 249, the turbine will continue to drive the compressors 10a, 10b, and if failure should occur in either the shaft 222, or coupling 226, or shaft 25 or shaft 31, the turbine will continue to be connected with the propeller either to drive it or, if insufficient air for combustion is delivered by the compressors, to be driven by windmilling of the propeller.

It will be seen that the invention permits the engine to continue to run safely, at least temporarily, after the failure of any part of the shafting of the engine. In particular the invention avoids the possibility that, on failure of the first shaft means between the low-pressure compressor and the turbine, the propeller, being driven by windmilling effect in flight, will continue to drive one or both the compressors thus feeding air to the combustion chambers to burn with fuel so causing the turbine, which is now disconnected from its load, to accelerate to a speed at which it is likely to disintegrate.

We claim:

1. A propeller-driving gas-turbine engine comprising a compressor having a rotor, combustion equipment, and a turbine having a rotor, said compressor combustion equipment and turbine being connected together in flow series, a propeller, the propeller and compressor being on the same side of the turbine, and shafting means drivingly interconnecting the turbine rotor with the compressor rotor and the propeller including first hollow shafting which is directly secured at one end to the turbine rotor, extends co-axially with the turbine rotor and is drivingly connected at its opposite end at least to the compressor rotor, and second shafting extending co-axially within the hollow shafting, said second shafting having one end adjacent the said one end of the first shafting and secured directly to the turbine rotor and said second shafting having its other end drivingly connected at least to said propeller, whereby the compressor rotor and the propeller each form part of the load of the turbine rotor and in the event of failure of one of said shaftings the turbine rotor remains drivingly connected to part at least of its load through the other of the shaftings.

2. A propeller-driving gas-turbine engine according to claim 1, comprising bearings supporting the second shafting within the first shafting and forming the sole connection therebetween, whereby the first and second shafting are torsionally free from one another.

3. A propeller-driving gas-turbine engine according to claim 2, said propeller being on the side of the compressor remote from the turbine, and comprising gearing drivingly connected between the second shafting and the propeller, said gearing including a quill shaft, said second shafting comprising a single continuous shaft extending throughout the length of the first shafting and co-axially through the compressor rotor and having driving engagement with the quill shaft.

4. A propeller-driving gas-turbine engine according to claim 2, said propeller being on the side of the compressor remote from said turbine, and comprising gearing interconnecting the second shafting and the propeller, said gearing including a quill shaft, and said second shafting comprising a pair of shafts arranged end to end and torsionally engaged at their adjacent ends, one shaft of said pair of shafts being at its end remote from the other shaft of said pair of shafts secured to the turbine rotor and said other shaft being at its end remote from the one shaft torsionally engaged with the quill shaft.

5. A propeller-driving gas-turbine engine according to claim 1 comprising also a torque-transmitting connection between said first shafting adjacent its opposite end and the second shafting.

6. A propeller-driving gas-turbine engine as claimed in claim 3, said turbine rotor having a plurality of torsionally-interconnected turbine discs, whereof one of said interconnected turbine discs is secured directly to the first shafting, and whereof another of said interconnected turbine discs is secured directly to the second shafting at its one end.

7. A propeller-driving gas-turbine engine as claimed in claim 1, said turbine being a two-stage turbine and its rotor having a high pressure rotor disc and a low pressure rotor disc, and said compressor having a high pressure rotor and a low pressure rotor, the first shafting comprising a turbine shaft connected directly to the high-pressure turbine disc, a first compressor shaft carrying the high-pressure compressor rotor and drivingly interconnected at its rear end with the turbine shaft, and a second compressor shaft carrying the low-pressure compressor rotor and drivingly interconnected at its rear end with the first compressor shaft.

8. A propeller-driving gas-turbine engine as claimed in claim 5, wherein the compressor is a two-stage compressor having a low-pressure rotor and a high-pressure rotor in flow series, and the first shafting comprises a low-pressure compressor shaft having the low-pressure compressor rotor mounted thereon, a high-pressure compressor shaft having the high-pressure compressor rotor mounted thereon, a turbine shaft, said high-pressure compressor shaft being at one end in torque-transmitting engagement with the low-pressure compressor shaft and at its other end in torque-transmitting engagement with the turbine shaft, a drive shaft having one end in torque-transmitting engagement with high-pressure compressor shaft, reduction gearing drivingly connected to the propeller and having a quill shaft, the drive shaft having its opposite end in torque-transmitting engagement with the quill shaft, and the second shafting is coaxially within the turbine shaft and part of the high-pressure compressor shaft, and a driving connection which is operative in the event of failure occurring in that part of said first shaft means between the high-pressure compressor rotor and the turbine, to provide torque-transmitting engagement of said second shafting with said high-pressure compressor shaft.

9. A propeller-driving gas-turbine engine as claimed in claim 8, comprising also a second driving connection between the second shafting and the drive shaft, which is operative in the event of failure occurring in that part of said first shaft means forward of the high-pressure compressor rotor, to transmit a drive from the second shafting to said drive shaft.

10. A propeller-driving gas-turbine engine as claimed in claim 8, comprising cooperating splines between the second shafting and the high-pressure compressor shaft, said splines having a circumferential clearance in normal operation.

11. A propeller-driving gas turbine engine according to claim 9, wherein said first driving connection comprises cooperating sets of splines, there being a circumferential clearance between said cooperating splines, and said second driving connection comprises second cooperating sets of splines, there being a circumferential clearance between the cooperating splines of said second cooperating set of splines.

References Cited in the file of this patent

UNITED STATES PATENTS

| 2,516,066 | McLeod et al. | July 18, 1950 |
| 2,623,356 | Coanda | Dec. 30, 1952 |
| 2,625,790 | Petrie | Jan. 20, 1953 |
| 2,629,982 | Hooker | Mar. 3, 1953 |
| 2,643,851 | McMahan | June 30, 1953 |

FOREIGN PATENTS

| 433,340 | Italy | Apr. 7, 1948 |

(Corresponding U.S., 2,516,066, July 18, 1950)